(12) United States Patent
Shimura et al.

(10) Patent No.: US 11,824,210 B2
(45) Date of Patent: Nov. 21, 2023

(54) ANGULAR BATTERY

(71) Applicant: PRIME PLANET ENERGY & SOLUTIONS, INC., Tokyo (JP)

(72) Inventors: Yosuke Shimura, Nagoya (JP); Hideki Asadachi, Toyota (JP); Yuji Tomita, Okazaki (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 0 days.

(21) Appl. No.: 17/388,207

(22) Filed: Jul. 29, 2021

(65) Prior Publication Data
US 2022/0052402 A1 Feb. 17, 2022

(30) Foreign Application Priority Data
Aug. 12, 2020 (JP) .................. 2020-136276

(51) Int. Cl.
*H01M 50/103* (2021.01)
*H01M 50/15* (2021.01)
*H01M 50/166* (2021.01)

(52) U.S. Cl.
CPC ......... *H01M 50/103* (2021.01); *H01M 50/15* (2021.01); *H01M 50/166* (2021.01)

(58) Field of Classification Search
CPC ... H01M 50/103; H01M 50/15; H01M 50/166
See application file for complete search history.

(56) References Cited

U.S. PATENT DOCUMENTS

| 2010/0203363 | A1* | 8/2010 | Kwak ............... H01R 13/24 429/7 |
| 2011/0117426 | A1* | 5/2011 | Choi ............... H01M 50/147 429/163 |
| 2016/0361783 | A1 | 12/2016 | Matsuura et al. |
| 2018/0269523 | A1 | 9/2018 | Kawate et al. |

FOREIGN PATENT DOCUMENTS

| CN | 101867112 A | 10/2010 |
| CN | 102064334 A | 5/2011 |
| CN | 107958972 A | 4/2018 |
| CN | 108028342 A | 5/2018 |
| EP | 3 089 240 A1 | 11/2016 |

(Continued)

*Primary Examiner* — Jane J Rhee
(74) *Attorney, Agent, or Firm* — Finnegan, Henderson, Farabow, Garrett & Dunner, LLP.

(57) ABSTRACT

The present disclosure provides an angular battery with enhanced protection of an electrode body. The present disclosure provides an angular battery including an electrode body and a battery case that accommodates the electrode body. The battery case is configured of a substantially U-shaped case body that has a rectangular bottom surface and a pair of long side surfaces provided integrally with the bottom surface and facing each other, and a substantially U-shaped lid body having an upper lid facing the bottom surface and a pair of short side surfaces provided integrally with the upper lid and facing each other. The electrode body is attached to the lid body. In the angular battery, the case body and the lid are joined to each other to form a state in which the electrode body is accommodated inside the battery case.

3 Claims, 3 Drawing Sheets

(56) References Cited

FOREIGN PATENT DOCUMENTS

| | | |
|---|---|---|
| JP | H08-148162 A | 6/1996 |
| JP | 10-021890 A | 1/1998 |
| JP | 2002-198011 A | 7/2002 |
| JP | 2003-197168 A | 7/2003 |
| JP | 2004-103368 A | 4/2004 |
| JP | 2004-220820 A | 8/2004 |
| JP | 2011-108612 A | 6/2011 |
| JP | 2012-174433 A | 9/2012 |
| JP | 2016-164918 A | 9/2016 |
| JP | 2017-004902 A | 1/2017 |
| JP | 2017-107773 A | 6/2017 |
| KR | 10 2011-0054705 A | 5/2011 |

* cited by examiner

ANGULAR BATTERY

BACKGROUND OF THE INVENTION

1. Field of the Invention

The present disclosure relates to an angular battery. The present application claims priority based on Japanese Patent Application No. 2020-136276 filed on Aug. 12, 2020, and the entire contents of the patent application are incorporated herein by reference.

2. Description of the Related Art

Generally, a battery such as a lithium-ion secondary battery includes an electrode body in which a positive electrode and a negative electrode are laminated in an insulated state, and a battery case for accommodating the electrode body. As one form of such a battery, an angular battery using a hexahedral (box-shaped) battery case is known. Japanese Patent Application Publication No. 2017-107773, Japanese Patent Application Publication No. 2004-103368, Japanese Patent Application Publication No. H10-21890, and Japanese Patent Application Publication No. 2002-198011 can be exemplified as related art documents relating to angular batteries.

For example, Japanese Patent Application Publication No. 2017-107773 describes a method for manufacturing an angular battery, the method including: a step of producing a battery case body having an angular opening with four corners fixed; a step of preparing an electrode body and attaching the electrode body to a flat plate-shaped sealing plate; a step of accommodating the electrode body having a sealing plate attached thereto inside of the battery case body through the angular opening; and a step of joining the sealing plate to the opening of the battery case body to seal the battery case.

SUMMARY OF THE INVENTION

Normally, from the viewpoint of improving the volumetric energy density, an electrode body is formed in the largest possible size within the range in which the electrode body can be inserted through an opening of a battery case. However, in an electrode body having a sealing plate attached thereto, the constituent components of the electrode body are in an unprotected state at the portion facing the battery case body. For example, a laminated surface formed by laminating a positive electrode and a negative electrode may be exposed, or may be only covered with a thin insulating film. Therefore, where an attempt is made to insert the electrode body through the angular opening after the battery case body has been produced, the electrode body may be caught in the opening and difficult to insert, or the electrode body may be damaged.

The present disclosure has been created in view of the above circumstances and provides an angular battery with enhanced protection of an electrode body.

According to the present disclosure, there is provided an angular battery comprising an electrode body in which a positive electrode and a negative electrode are laminated in an insulated state, and a hexahedral battery case that accommodates the electrode body. The battery case is configured of a substantially U-shaped case body that has a rectangular bottom surface and a pair of long side surfaces provided integrally with the bottom surface and having, as one side thereof, a long side of the rectangular bottom surface and facing each other; and a substantially U-shaped lid body having an upper lid facing the bottom surface and a pair of short side surfaces provided integrally with the upper lid and interposed between the pair of long side surfaces and facing each other. The electrode body is attached to the lid body. In the angular battery, the case body and the lid are joined to each other to form a state in which the electrode body is accommodated inside the battery case.

In the above configuration, a pair of surfaces of the electrode body attached to the lid body is covered with short side surfaces integrally provided on the lid body. The short side surfaces can function as, for example, an insertion guide for the electrode body when the electrode body is inserted into the case body, and the case body and the lid body are integrated. Further, the short side surfaces function as protective members that protect the electrode body by preventing the case body and the electrode body from interfering with each other. As a result, the electrode body is less likely to be damaged during the manufacturing process, and the protective property of the electrode body can be enhanced.

In a desired embodiment of the angular battery disclosed herein, the lid body is a bent product in which a single flat plate is bent. As a result, the yield of the material can be improved, and the productivity and efficiency can be improved. Therefore, the manufacturing cost can be reduced.

In a desired embodiment of the angular battery disclosed herein, the case body is a bent product in which a single flat plate is bent. As a result, the yield of the material can be improved, and the productivity and efficiency can be improved. Therefore, the manufacturing cost can be reduced.

In a desired embodiment of the angular battery disclosed herein, the electrode body is accommodated in the battery case so that laminated surfaces formed by laminating the positive electrode and the negative electrode face the short side surfaces of the lid body and do not face the long side surfaces of the case body. By covering the laminated surfaces of the electrode body with the short side surfaces provided integrally with the lid body, damage to the laminated surface can be suitably prevented.

DESCRIPTION OF THE PREFERRED EMBODIMENTS

Hereinafter, desired embodiments of the techniques disclosed herein will be described with reference to the drawings. Matters other than those specifically mentioned in the present specification, but necessary for implementing the present disclosure (for example, general configuration and manufacturing process of the battery that do not characterize the present disclosure) can be ascertained by as a design matter to be addressed by a person skilled in the art on the basis of the related art. The present disclosure can be implemented based on the contents disclosed in the present description and common technical knowledge in the pertinent field.

In the present description, the term "battery" refers to all general power storage devices capable of releasing electrical energy, and thus is a concept inclusive of a primary battery and a secondary battery. Further, in the present description, the term "secondary battery" refers to all general power storage devices capable of repeatedly charging and discharging, and thus is a concept inclusive of a so-called storage battery (chemical battery) such as a lithium-ion secondary battery and a nickel hydrogen battery, and a capacitor (physical battery) such as an electric double-layer capacitor.

Figure 1:
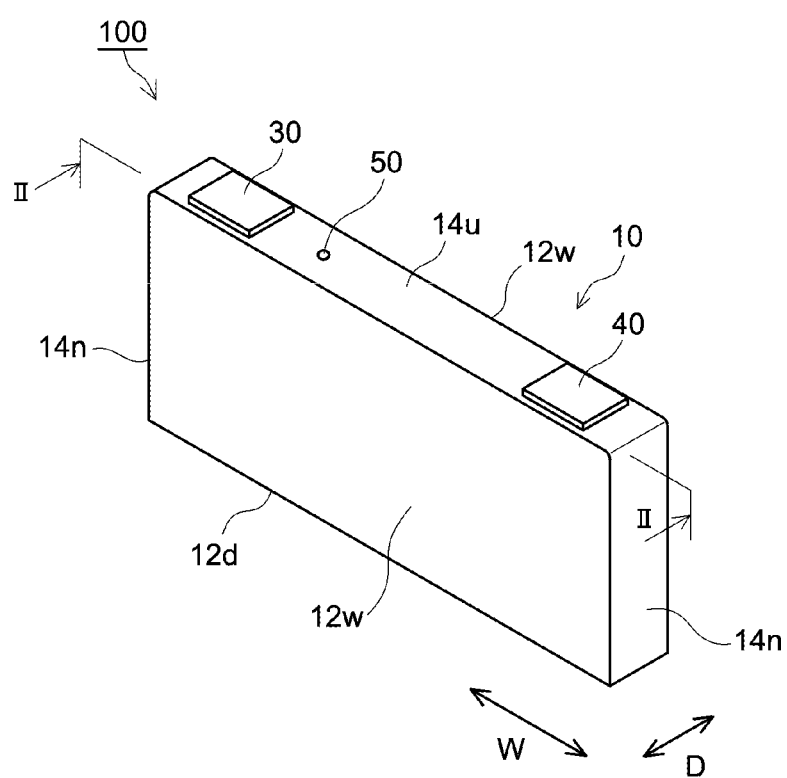
FIG. 1 is a schematic perspective view of an angular battery according to an embodiment.
Figure 2:
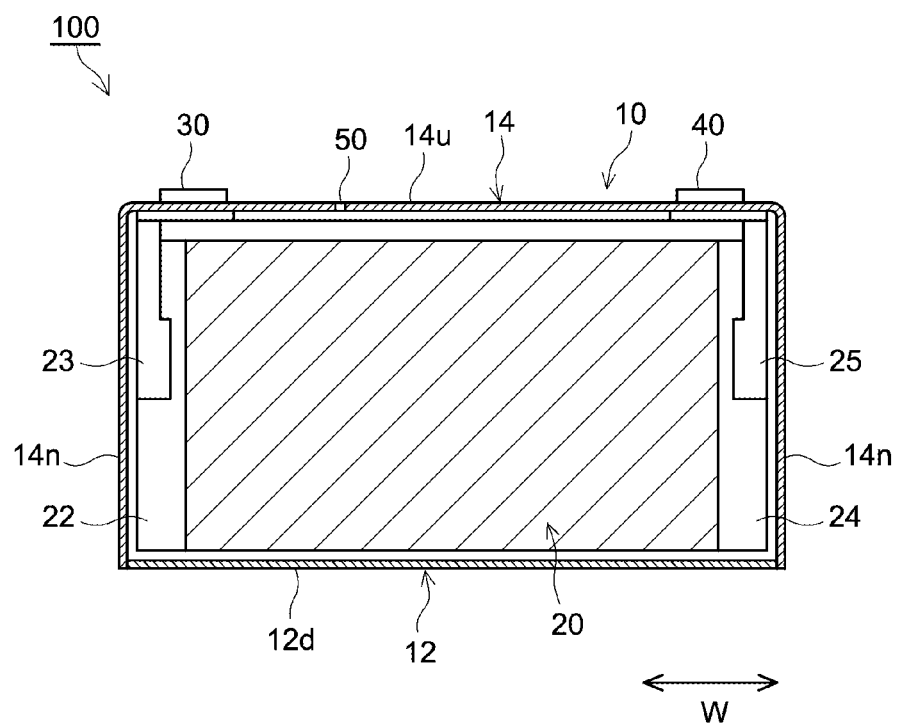
FIG. 2 is a schematic vertical cross-sectional view taken along the line II-II in FIG. 1.
Figure 3:
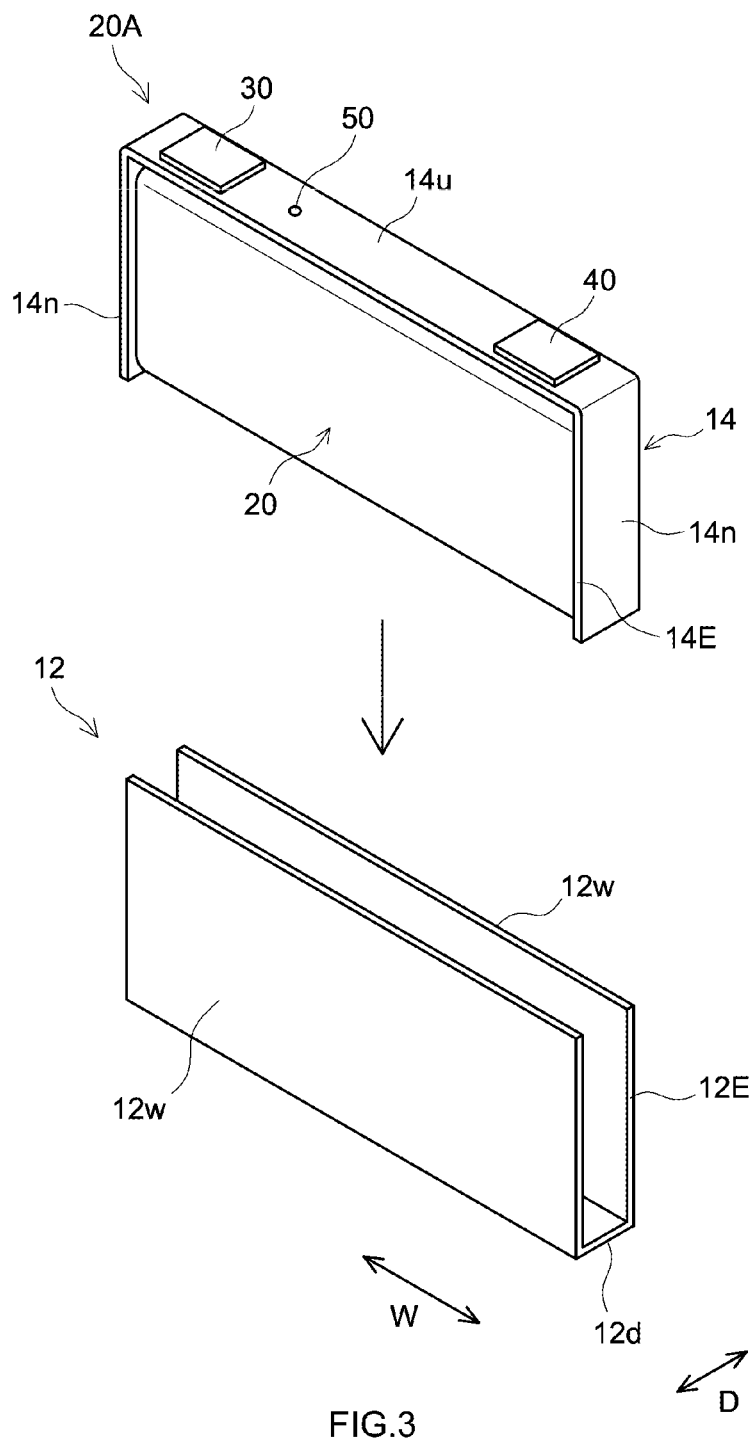
FIG. 3 is a schematic exploded perspective view of the angular battery shown in FIG. 1.

FIG. 1 is a schematic perspective view of an angular battery 100. FIG. 2 is a schematic vertical sectional view taken along the line II-II of FIG. 1. FIG. 3 is a schematic exploded perspective view of the angular battery 100.

As shown in FIG. 2, the angular battery 100 includes a battery case 10 and an electrode body 20 accommodated inside the battery case 10. Here, although not shown, the angular battery 100 further includes an electrolyte accommodated inside the battery case 10. In the figure, reference numeral W indicates a longitudinal direction, and reference numeral D indicates a thickness direction orthogonal to the longitudinal direction. However, these directions are merely directions for convenience of explanation, and do not limit in any way the installation mode of the angular battery 100. Hereinafter, each constituent component will be described in order.

The battery case 10 is a container for accommodating the electrode body 20. Here, the battery case 10 is hermetically sealed. The battery case 10 is typically made of a metal such as aluminum, aluminum alloy, or stainless steel. As shown in FIG. 1, the battery case 10 has a hexahedral outer shape (here, a rectangular parallelepiped shape). The battery case 10 has a shape that is line-symmetrical in the longitudinal direction W. The battery case 10 has a rectangular bottom surface 12*d*, a pair of long side surfaces 12*w* facing each other, a pair of short side surfaces 14*n* facing each other and narrower than the long side surface 12*w*, and an upper lid 14*u* facing the bottom surface 12*d*. In the present description, the term "rectangular" encompasses, for example, a shape in which a straight long side and a straight short side are joined to each other via a curve, a shape in which at least one of a long side and a short side is curved, convex or concave, and bent, rather than being straight and which is thereby configured of a plurality of straight lines or curves, and the like.

Each of the pair of long side surfaces 12*w* extends along the longitudinal direction W. Each of the pair of long side surfaces 12*w* is a side surface having, as one side thereof, a long side of the rectangular bottom surface 12*d*. The pair of short side surfaces 14*n* are interposed between the pair of long side surfaces 12*w*. Each of the pair of short side surfaces 14*n* extends along the thickness direction D. Each of the pair of short side surfaces 14*n* is a side surface having, as one side thereof, a short side of the rectangular bottom surface 12*d*. As shown in FIG. 3, the battery case 10 is configured by combining two members, namely, a case body 12 and a lid body 14. This will be described hereinbelow in detail.

The case body 12 includes the bottom surface 12*d* and the pair of long side surfaces 12*w* of the battery case 10. As shown in FIG. 3, the case body 12 has a three-sided configuration. The case body 12 is configured to have a size and shape that can accommodate the entire electrode body 20, which will be described later, inside thereof, that is, in a space surrounded by the bottom surface 12*d* and the pair of long side surfaces 12*w*. The bottom surface 12*d* has a rectangular (oblong) shape. Here, the pair of long side surfaces 12*w* have a rectangular (oblong) shape. Here, the pair of long side surfaces 12*w* have the same shape and size. However, the pair of long side surfaces 12*w* may be different in shape and/or size from each other. Substantially U-shaped end faces 12E are formed at both ends of the case body 12 in the longitudinal direction W, respectively.

Here, the case body 12 is a bent product. The long side surfaces 12*w* are bent upward and extend from the bottom surface 12*d*. Here, the case body 12 is formed so that a pair of long side surfaces 12*w* rise vertically from the bottom surface 12*d*. The angle formed by the bottom surface 12*d* and each of the pair of long side surfaces 12*w* is 90°. In the case body 12, the surface facing the bottom surface 12*d* is opened (open). The case body 12 has a substantially U-like shape. In the present description, the term "substantially U-shaped" generally means all shapes in which three (here, the bottom surface 12*d* and the long side surfaces 12*w*) of the four sides are closed and one side is open, for example, as in a rectangular shape without one side or a U-like shape. Therefore, the angle formed by the bottom surface 12*d* and the long side surface 12*w* does not have to be a right angle, and may be, for example, an acute angle or an obtuse angle.

Each of the pair of long side surfaces 12*w* extends from the bottom surface 12*d* and is provided integrally with the bottom surface 12*d*. In the present description, the expression "the long side surface 12*w* is provided integrally with the bottom surface 12*d*" means that the long side surface 12*w* is continuously provided from the bottom surface 12*d*, without forming a seam (joint portion) between the long side surface 12*w* and the bottom surface 12*d*. Therefore, in the angular battery 100, it can be confirmed that the long side surfaces 12*w* are provided integrally with the bottom surface 12*d* by the fact that no joint portion (for example, a welded joint portion) is formed at the boundary between the bottom surface 12*d* and the long side surfaces 12*w*.

The lid body 14 is configured of the pair of short side surfaces 14*n* and the upper lid 14*u* of the battery case 10. As shown in FIG. 3, the lid body 14 has a three-sided configuration. Here, the pair of short side surfaces 14*n* have a rectangular (oblong) shape. Here, the pair of short side surfaces 14*n* have the same shape and size. However, the pair of short side surfaces 14*n* may be different in shape and/or size from each other. The upper lid 14*u* has a rectangular (oblong) shape. The upper lid 14*u* has the same shape and size as the bottom surface 12*d*. Substantially U-shaped end faces 14E are formed at both ends of the lid body 14 in the thickness direction D, respectively.

Here, the lid body 14 is a bent product. The short side surfaces 14*n* are bent downward and extend from the upper lid 14*u*. The lid body 14 is formed so that the pair of short side surfaces 14*n* rise vertically from the upper lid 14*u*. The angle formed by the upper lid 14*u* and each of the pair of short side surfaces 14*n* is 90°. However, the angle formed by the upper lid 14*u* and the short side surface 14*n* does not have to be a right angle, and may be, for example, an acute angle or an obtuse angle. The lid body 14 has a substantially U-like shape.

Each of the pair of short side surfaces 14*n* extends from the upper lid 14*u* and is provided integrally with the upper lid 14*u*. In the present description, the expression "the short side surface 14*n* is provided integrally with the upper lid 14*u*" means that the short side surface 14*n* is continuously provided from the upper lid 14*u*, without forming a seam (joint portion) between the short side surface 14*n* and the upper lid 14*u*. Therefore, in the angular battery 100, it can be confirmed that the short side surfaces 14*n* are provided integrally with the upper lid 14*u* by the fact that no joint portion (for example, a welded joint portion) is formed at the boundary between the upper lid 14u and the short side surfaces 14n.

As shown in FIGS. 1 and 2, a positive electrode external terminal 30 and a negative electrode external terminal 40 are attached to the upper surface of the battery case 10, that is, the upper lid 14u. The positive electrode external terminal 30 is electrically connected to the positive electrode of the electrode body 20 via a positive electrode current collector plate 23 (see FIG. 2) described hereinbelow. The negative electrode external terminal 40 is electrically connected to the negative electrode of the electrode body 20 via a negative electrode current collector plate 25 (see FIG. 2) described hereinbelow. The upper lid 14u is also provided with a liquid injection hole 50. The liquid injection hole 50 is a through hole for injecting a liquid electrolyte (electrolytic solution) into the inside of the battery case 10. A cap (not shown) is attached to the liquid injection hole 50 after the electrolytic solution is injected. The liquid injection hole 50 is hermetically sealed by a cap.

In the angular battery 100, the end faces 12E of the case body 12 and the end faces 14E of the lid body 14 are joined (for example, welded) to each other. In more detail, when viewed from the side of the short side surface 14n, a substantially U-shaped joint portion (for example, a welded joint portion) is formed at the outer edge portion of the short side surface 14n, specifically, at the boundary between the bottom surface 12d and the short side surface 14n, and the boundary between the pair of long side surfaces 12w and the short side surface 14n. Further, when viewed from the side of the long side surface 12w, a substantially U-shaped joint portion (for example, a welded joint portion) is formed at the outer edge portion of the long side surface 12w, specifically, at the boundary between the upper lid 14u and the long side surface 12w, and at the boundary between the pair of short side surfaces 14n and the long side surface 12w.

The electrode body 20 is accommodated inside the battery case 10. The electrode body 20 may be the same as the conventional one, and is not particularly limited. Although not shown, the electrode body 20 typically has a plurality of positive electrodes and a plurality of negative electrodes. The positive electrode includes a positive electrode current collector and a positive electrode active material layer that is fixedly attached to the positive electrode current collector and includes a positive electrode active material. The negative electrode includes a negative electrode current collector and a negative electrode active material layer that is fixedly attached to the negative electrode current collector and includes a negative electrode active material. Here, the electrode body 20 is a flat wound electrode body formed by winding a band-shaped positive electrode and a band-shaped negative electrode in an insulated state. The wound electrode body can be produced, for example, by laminating the band-shaped positive electrode and the band-shaped negative electrode with a band-shaped separator interposed therebetween, winding the laminate in the winding axis direction (here, the same as the longitudinal direction W), and then pressing from the side surface direction to flatten it. However, the electrode body 20 may be a stacked-type electrode body in which angular (typically rectangular) positive electrodes and angular (typically rectangular) negative electrodes are stacked in an insulated state.

As shown in FIG. 2, a laminated portion in which the positive electrode active material layer and the negative electrode active material layer are laminated in an insulated state is formed in the central portion of the electrode body 20 in the longitudinal direction W. Meanwhile, at the left end portion of the electrode body 20 in the longitudinal direction W, a portion (positive electrode current collector exposed portion) 22 of the positive electrode current collector in which the positive electrode active material layer is not formed protrudes from the laminated portion. A positive electrode current collector plate 23 is attached to the positive electrode current collector exposed portion 22. The positive electrode current collector plate 23 is electrically connected to the positive electrode external terminal 30. Further, at the right end portion of the electrode body 20 in the longitudinal direction W, a portion (negative electrode current collector exposed portion) 24 of the negative electrode current collector in which the negative electrode active material layer is not formed protrudes from the laminated portion. A negative electrode current collector plate 25 is attached to the negative electrode current collector exposed portion 24. The negative electrode current collector plate 25 is electrically connected to the negative electrode external terminal 40.

The electrode body 20 is attached to the lid body 14. The electrode body 20 has a substantially rectangular parallelepiped outer shape. The electrode body 20 is accommodated in a space surrounded by the upper lid 14u and the pair of short side surfaces 14n. Both end faces of the electrode body 20 in the winding axis direction face the pair of short side surfaces 14n of the lid body 14. The two end faces of the electrode body 20 in the winding axis direction do not face the pair of long side surfaces 12w of the case body 12. The outer peripheral surface of the electrode body 20 faces the pair of long side surfaces 12w of the case body 12. The end surface of the electrode body 20 in the winding axis direction is an example of a laminated surface in which a positive electrode and a negative electrode are laminated.

The surface of the electrode body 20 may be partially or wholly covered with an insulating film. The insulating film is a member that prevents direct contact (conduction) between the electrode body 20 and the battery case 10. The material, shape, and the like of the insulating film may be the same as the conventional ones, and are not particularly limited. The insulating film may be made of a resin such as polypropylene (PP) or polyethylene (PE). The shape of the insulating film may be, for example, a bag shape having one side opened so as to accommodate the electrode body 20, a tubular shape, or a sheet shape.

The electrolytic solution is accommodated inside the battery case 10. The electrolytic solution may be the same as the conventional one, and is not particularly limited. The electrolytic solution may be a non-aqueous electrolytic solution in which a supporting salt such as a lithium salt is contained in an organic solvent (non-aqueous solvent).

As shown in FIG. 3, such an angular battery 100 can be manufactured by a manufacturing method including, for example, the following steps: a step of preparing the case body 12; a step of producing an electrode body assembly 20A having a lid body 14 and an electrode body 20; and a step of joining the case body 12 and the electrode body assembly 20A.

In the step of preparing the case body 12, the case body 12 constituting the battery case 10 is prepared. The case body 12 can be prepared, for example, by bending a single flat plate having an angular shape (typically a rectangular shape) according to the dimensions of the electrode body 20 and thereby forming the bottom surface 12d and long side surfaces 12w.

In the step of producing the electrode body assembly 20A, the electrode body assembly 20A is prepared. The electrode body assembly 20A is a unit in which the lid body 14 constituting the battery case 10 and the electrode body 20 are integrated. Specifically, for example, first, the lid body 14 is prepared. The lid body 14 can be prepared, for example, by bending a single flat plate having an angular shape (typically a rectangular shape) according to the dimensions of the case body 12 and thereby forming the short side surfaces 14n and the upper lid 14u. Next, the positive electrode current collector plate 23, the positive electrode external terminal 30, the negative electrode current collector plate 25, and the negative electrode external terminal 40 are attached to the lid body 14. Next, the electrode body 20 is inserted into a space surrounded by the upper lid 14u and the pair of short side surfaces 14n of the lid body 14, for example, so that the winding axis direction is along the longitudinal direction W. Thereby, typically, the entire electrode body 20 is accommodated in the space surrounded by the upper lid 14u and the pair of short side surfaces 14n.

Next, the positive electrode current collector plate 23 is welded to the positive electrode current collector exposed portion 22 of the electrode body 20. As a result, the positive electrode of the electrode body 20 is electrically connected to the positive electrode external terminal 30 via the positive electrode current collector plate 23. Further, the negative electrode current collector plate 25 is welded to the negative electrode current collector exposed portion 24 of the electrode body 20. As a result, the negative electrode of the electrode body 20 is electrically connected to the negative electrode external terminal 40 via the negative electrode current collector plate 25. As described above, the lid body 14 and the electrode body 20 can be integrated to produce the electrode body assembly 20A.

In the step of joining the case body 12 and the electrode body assembly 20A, the case body 12 and the electrode body assembly 20A are combined. For example, first, the electrode body assembly 20A is conveyed above the case body 12 by a robot arm or the like, and the electrode body assembly 20A is inserted from above the case body 12. As a result, the electrode body 20 is accommodated inside the case body 12, that is, in a space surrounded by the bottom surface 12d and the pair of long side surfaces 12w. Next, the boundary portion (seam) between the case body 12 and the lid body 14 is joined. The joining method may be the same as the conventional one and is not particularly limited. The joining can be performed by, for example, laser welding. As a result, a joint portion can be formed at the boundary between the case body 12 and the lid body 14, and the case body 12 and the lid body 14 can be joined. Here, after the joining step, the electrolytic solution is injected from the liquid injection hole 50, and the liquid injection hole 50 is sealed with a cap. The angular battery 100 can be manufactured as described above.

In the angular battery 100, the lid body 14 and the electrode body 20 are integrated to configure the electrode body assembly 20A. That is, the electrode body 20 is attached to the lid body 14, and the short side surface 14n provided integrally with the upper lid 14u cover the pair of surfaces of the electrode body 20. The short side surfaces 14n can function, for example, as insertion guides for the electrode body 20 when the case body 12 and the lid body 14 are integrated. Further, the short side surfaces 14n function as protective members that protect the electrode body 20 by preventing the case body 12 and the electrode body 20 from interfering with each other. Therefore, it is possible to improve the insertability and protection when the case is inserted. Further, for example, when a robot arm or the like that conveys the electrode body assembly 20A collides with the short side surface 14n and some impact is applied to the electrode body 20, the short side surface 14n can function as a buffer member that cushions the impact. Therefore, the ability to protect the electrode body assembly 20A during transportation can be enhanced. As a result, the electrode body 20 is less likely to be damaged in the manufacturing process as compared with the conventional method, and the ability to protect the electrode body 20 can be enhanced.

In addition, by configuring the battery case 10 of the angular battery 100 using two members, namely, the case body 12 and the lid body 14, the number of joints is reduced as compared with the case of using a total of four members, for example, by using the upper lid 14u and the short side surfaces 14n as separate members. As a result, the strength of the battery case can be improved. For example, in applications such as those for a high-output power source for driving a vehicle, a battery pack in which a plurality of angular batteries 100 is arranged so that the long side surfaces 12w face each other and is restrained by a restraining jig is widely used. The angular battery 100 is less likely to be deformed even when a restraining force is applied from the side of the long side surface 12w in this way. As a result, the reliability of the angular battery 100 and a battery pack including the angular battery 100 can be improved.

The angular battery 100 can be used for various purposes, but can be desirably used as a large-sized (large-capacity) battery having a particularly high energy density. Examples of suitable applications include a power source (power source for driving a vehicle) for a motor mounted on a vehicle such as an electric vehicle (EV), a hybrid vehicle (HV), and a plug-in hybrid vehicle (PHV).

Although the specific examples of the present disclosure have been described in detail above, the above-described embodiments are merely exemplary and do not limit the scope of the claims. The techniques described in the claims include various changes and modifications of the specific examples illustrated above.

What is claimed is:

1. An angular battery comprising:
   an electrode body in which a positive electrode and a negative electrode are laminated in an insulated state; and
   a hexahedral battery case that accommodates the electrode body, wherein
   the battery case is made of a metal,
   the battery case is configured of
   a substantially U-shaped case body that consists only of a rectangular bottom surface and a pair of long side surfaces provided integrally with the bottom surface and having, as one side thereof, a long side of the rectangular bottom surface and facing each other; and
   a substantially U-shaped lid body having an upper lid facing the bottom surface and a pair of short side surfaces provided integrally with the upper lid and interposed between the pair of long side surfaces and facing each other;
   the lid body is a bent product in which a single flat plate made of a metal is bent to form the lid body;
   the case body is a bent product in which a single flat plate made of a metal is bent to form the case body;
   the electrode body is attached to the lid body;
   the case body and the lid body are joined to each other to form a state in which the electrode body is accommodated inside the battery case.

2. The angular battery according to claim 1, wherein the electrode body is accommodated in the battery case so that laminated surfaces formed by laminating the positive electrode and the negative electrode face the short side surfaces of the lid body and do not face the long side surfaces of the case body.

3. The angular battery according to claim 1, wherein the case body and the lid body are joined to each other by laser welding.

* * * * *